(12) United States Patent
Nakamura et al.

(10) Patent No.: US 9,542,605 B2
(45) Date of Patent: Jan. 10, 2017

(54) STATE RECOGNITION SYSTEM AND STATE RECOGNITION METHOD

(71) Applicants: Clarion Co., Ltd., Saitama-shi, Saitama (JP); NISSAN MOTOR CO., LTD., Yokohama-shi, Kanagawa (JP)

(72) Inventors: Katsuyuki Nakamura, Tokyo (JP); Kota Irie, Saitama (JP); Masahiro Kiyohara, Tokyo (JP); Osamu Fukata, Yokohama (JP); Yasuhisa Hayakawa, Yokohama (JP)

(73) Assignees: CLARION CO., LTD., Saitama (JP); NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/412,385

(22) PCT Filed: Jul. 3, 2013

(86) PCT No.: PCT/JP2013/068241
§ 371 (c)(1),
(2) Date: Dec. 31, 2014

(87) PCT Pub. No.: WO2014/007286
PCT Pub. Date: Jan. 9, 2014

(65) Prior Publication Data
US 2015/0169967 A1   Jun. 18, 2015

(30) Foreign Application Priority Data
Jul. 3, 2012   (JP) .................................. 2012-149322

(51) Int. Cl.
*G06K 9/00* (2006.01)
*G06K 9/03* (2006.01)
*H04N 7/18* (2006.01)

(52) U.S. Cl.
CPC ............. *G06K 9/00798* (2013.01); *G06K 9/03* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 9,082,021 | B2 * | 7/2015 | Maruoka | B60R 1/00 |
| 2004/0037457 | A1 * | 2/2004 | Wengender | G06T 7/0002 |
| | | | | 382/141 |
| 2007/0263902 | A1 | 11/2007 | Higuchi et al. | |
| 2008/0246860 | A1 * | 10/2008 | Kusama | G06T 5/005 |
| | | | | 348/241 |

(Continued)

FOREIGN PATENT DOCUMENTS

| | | | |
|---|---|---|---|
| JP | 2003-255430 A | 9/2003 | |
| JP | 2006-315489 A | 11/2006 | |

(Continued)

*Primary Examiner* — Hadi Akhavannik
(74) *Attorney, Agent, or Firm* — Volpe and Koenig, P.C.

(57) ABSTRACT

It is provided a state recognition system configured to recognize a state of a traveling road on which a vehicle travels, the state recognition system being configured to: select a substance adhered on a lens of a camera mounted on the vehicle in an image captured by the camera; and determine whether the traveling road is on-road or off-road by determining a type and an amount of the selected adhered substance.

20 Claims, 7 Drawing Sheets

(56) References Cited

U.S. PATENT DOCUMENTS

2010/0250064 A1* 9/2010 Ota ................... B60W 40/076
  701/36
2014/0010408 A1* 1/2014 Irie ................... G06K 9/00791
  382/103

FOREIGN PATENT DOCUMENTS

| | | |
|---|---|---|
| JP | 2007-071539 A | 3/2007 |
| JP | 2007-228448 A | 9/2007 |
| JP | 2008-282067 A | 11/2008 |
| JP | 2009-002797 A | 1/2009 |
| JP | 2010-146284 A | 7/2010 |
| JP | 2011-174794 A | 9/2011 |

* cited by examiner

STATE RECOGNITION SYSTEM AND STATE RECOGNITION METHOD

INCORPORATE BY REFERENCE

The present application claims priority from Japanese patent application JP 2012-149322 filed on Jul. 3, 2012, the content of which is hereby incorporated by reference into this application.

BACKGROUND OF THE INVENTION

This invention relates to a system for recognizing a state, and more particularly, to a system to be mounted on a vehicle to recognize a state of a road surface.

With the advance in vehicle electronic control technology, there has been a request for a technology for accurately determining a state of a road surface. The determination of the state of the road surface is preferred in order to realize safe traveling of a vehicle such as an automobile.

The following technology is disclosed in, for example, JP 2011-174794 A. Specifically, an image captured by a camera is subjected to Gabor filtering to obtain short-period and long-period Gabor filtering data. Both the data are normalized, and then a normalized value is compared with a predetermined threshold value to determine a dry/wet state of the road surface.

SUMMARY OF THE INVENTION

According to the above-mentioned technology disclosed in JP 2011-174794 A, the dry/wet state of the road surface is determined based on a frequency analysis result of a road surface texture. Consequently, determination of the state of the road surface is difficult in bad weather or a dark night where the texture is not clearly visible. Moreover, when the technology is applied to an on-vehicle camera installed outside a car, dirt easily adheres to a lens, and determination of the state of the road surface is consequently difficult.

It is an object of this invention to suitably determine whether a traveling road state is on-road or off-road even in such a situation where it is impossible to observe a state of a road surface clearly.

The representative one of inventions disclosed in this application is outlined as follows. There is provided a state recognition system configured to recognize a state of a traveling road on which a vehicle travels, the state recognition system being configured to select a substance adhered on a lens of a camera mounted on the vehicle in an image captured by the camera; and determine whether the traveling road is on-road or off-road by determining a type and an amount of the selected adhered substance.

According to the representative embodiment of this invention, the type of the traveling road can be suitably determined even when the road surface state cannot be clearly observed. Other problems, configurations, and effects than those described above become apparent from the following description of embodiments.

DETAILED DESCRIPTION OF THE PREFERRED EMBODIMENTS

<First Embodiment>

Figure 1:
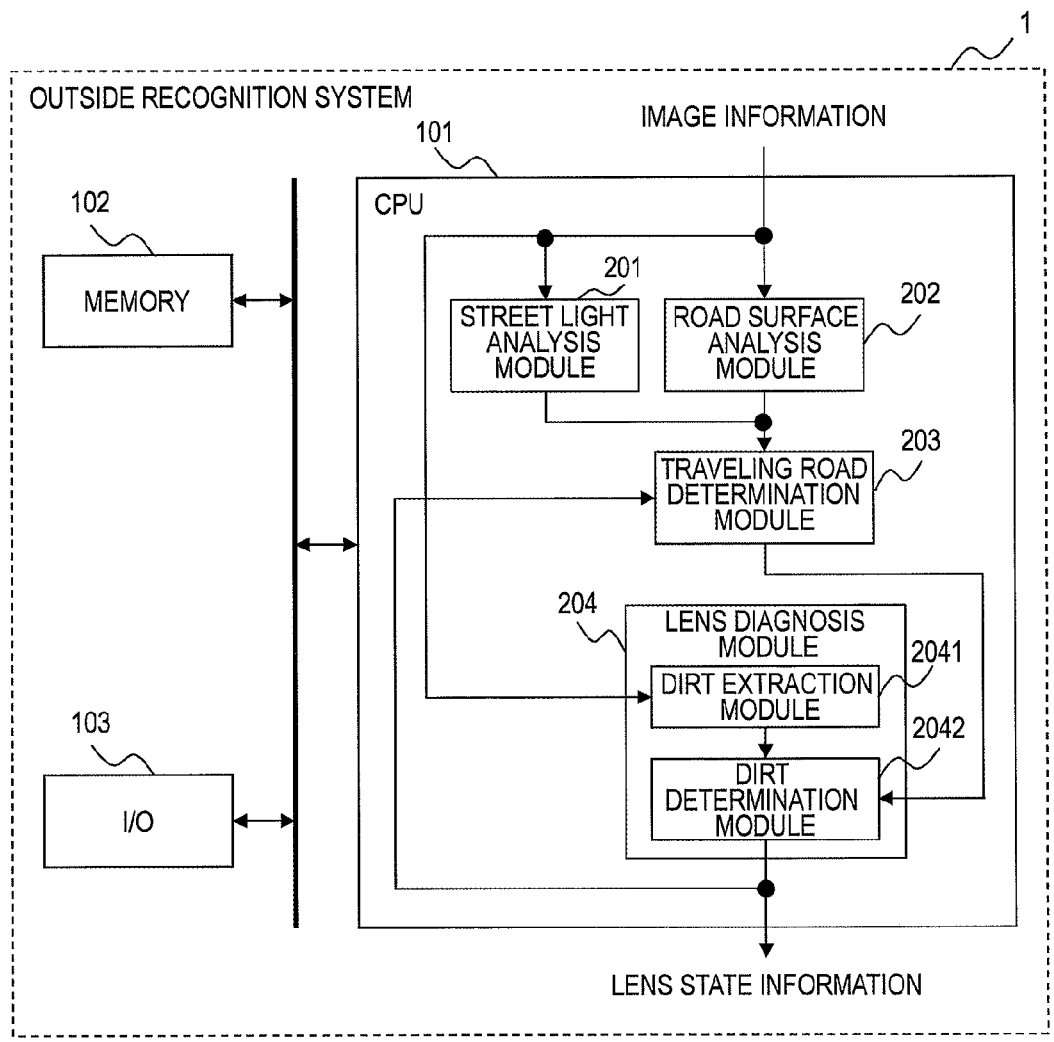
FIG. 1 is a block diagram illustrating a configuration of an outside recognition system according to a first embodiment of this invention.

FIG. 1 is a block diagram illustrating a configuration of an outside recognition system 1 according to a first embodiment of this invention.

The outside recognition system 1 according to this embodiment is a computer that includes a processor (central processing unit: CPU) 101, a memory 102, and an input/output interface 103 interconnected with each other through a bus.

The processor 101 is an arithmetic unit configured to execute a program stored in the memory 102.

The memory 102 is, for example, a nonvolatile storage unit such as a flash memory or a high-speed volatile storage unit such as a dynamic random access memory (DRAM), and stores an operating system (OS) and an application program. The processor 101 executes the OS to implement a basic function of the computer, and executes the application program to implement a function to be provided by the outside recognition system 1.

The processor 101 executes a predetermined program to implement a street light analysis module 201, a road surface analysis module 202, a traveling road determination module 203, and a lens diagnosis module 204 on the outside recognition system 1.

An on-vehicle camera for capturing an image to be input to the outside recognition system 1 is a wide-angle camera having a wide angle of view or a narrow-angle camera having a narrow angle of view and capable of capturing images far into the distance, and mounted to a front or a rear of a vehicle. Generally, the camera mounted to the rear of the vehicle is affected more easily by vehicle's splashing of mud or snow, and a lens thereof is more easily dirtied. Thus, effects provided by applying this embodiment are higher.

The street light analysis module 201 extracts, among regions (sky) above the horizon of the input image, a high luminance region brighter than a predetermined luminance level to analyze lights (street lights and lights of surrounding buildings) around a traveling road. The street light analysis module 201 has a day/night determination function, and is controlled to operate only at night. The day/night determination function can determine a day or a night based on brightness of the input image or exposure control (auto exposure) information of the camera for capturing images.

The road surface analysis module 202 extracts a feature of a road surface from the input image, and outputs a feature amount and a recognition result of the road surface as road surface information. A configuration of the road surface analysis module 202 is described below in detail referring to FIG. 2. The traveling road determination module 203 determines whether a state of the traveling road is on-road or off-road based on the light information analyzed by the street light analysis module 201, the road surface analyzed by the road surface analysis module 202, and a lens state diagnosed by the lens diagnosis module 204. In other words, the traveling road determination module 203 determines whether the traveling road is on-road (paved road) or off-road (unpaved road, muddy road, snowy road, meadow, or desert) by time-sequentially analyzing the light information and the road information. Processing executed by the traveling road determination module 203 is described below in detail referring to FIG. 3.

The lens diagnosis module 204 diagnoses a lens state based on the image information and the traveling road state, and includes a dirt extraction module 2041 and a dirt determination module 2042. Representative examples of lens dirt include water drops, mud, snow, and a water drop trace, and the dirt extraction module 2041 extracts regions (adhered substance candidate regions) suspected to be such dirt. For example, the dirt extraction module 2041 extracts an adhered substance candidate region based on an edge, a color, a shape, or a change over time in the input image.

The dirt determination module 2042 determines a type of the extracted adhered substance candidate region based on the traveling road state determined by the traveling road determination module 203, and outputs the determined type of the adhered substance candidate region and an amount of the adhered substance as lens state information. For example, at night, distinction between a water drop and muddy water is difficult, and thus more accurate distinction is realized based on the traveling road state. When an adhered substance suspected to be a water drop or muddy water is detected in the on-road state, the adhered substance is determined to be a water drop. On the other hand, when an adhered substance suspected to be a water drop or muddy water is detected in the off-road state, the adhered substance is determined to be muddy water. Accordingly, the muddy water having a greater influence as lens dirt can be determined more appropriately.

The outside recognition system 1 may include a secondary storage unit. The secondary storage unit is, for example, a magnetic storage unit or a large-capacity nonvolatile storage unit such as a flash memory, and may store a program executed by the processor 101 and data used by the processor 101 during the program execution. In this case, the program is read from the secondary storage unit, and loaded to the memory 102 to be executed by the processor 101.

The input/output interface 103 is an interface such as a universal serial bus (USB) for inputting/outputting data. The input/output interface 103 may include a communication interface coupled to an in-vehicle network.

The program executed by the processor 101 is provided to the computer via the nonvolatile storage unit or the network. Thus, it is preferred that the computer include an interface for reading a storage medium (such as compact disk (CD)-read-only memory (ROM) or flash memory).

Figure 2:
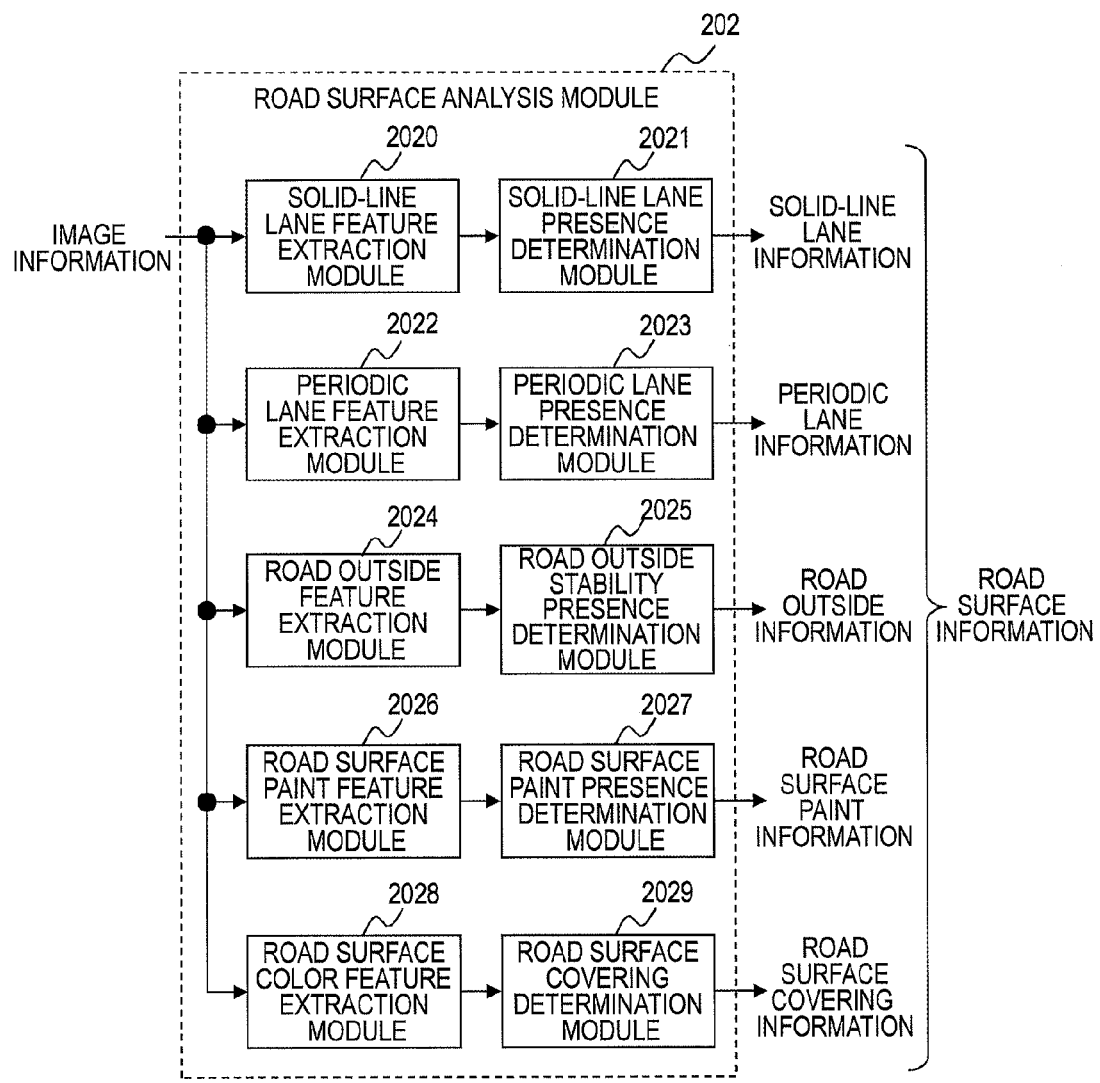
FIG. 2 is a block diagram illustrating the configuration of the road surface analysis module according to the first embodiment of this invention.

FIG. 2 is a block diagram illustrating the configuration of the road surface analysis module 202 according to the first embodiment.

The road surface analysis module 202 includes a solid-line lane feature extraction module 2020, a solid-line lane presence determination module 2021, a periodic lane feature extraction module 2022, a periodic lane presence determination module 2023, a road outside feature extraction module 2024, a road outside stability presence determination module 2025, a road surface paint feature extraction module 2026, a road surface paint presence determination module 2027, a road surface color feature extraction module 2028, and a road surface covering presence determination module 2029. Those components analyze the road surface, to thereby suitably determine a traveling road state even in bad weather or a dark night.

The solid-line lane feature extraction module 2020 extracts a solid-line component from images of left-and-right lane analysis regions, and analyzes linearity and a color of the extracted solid line to output a feature amount of a solid-line lane. The solid-line lane presence determination module 2021 determines whether or not a solid line is present based on the solid-line lane feature amount, and outputs solid-line lane information indicating a probability of presence of a solid-line lane.

The periodic lane feature extraction module 2022 extracts a shape (broken line or the like) having periodicity from the images of the left-and-right lane analysis regions, and analyzes the periodicity of the extracted shape to output a feature amount of a periodic lane. The periodic lane presence determination module 2023 determines whether or not a periodic lane is present based on the periodic lane feature amount, and outputs periodic lane information indicating a probability of presence of a periodic lane.

Lanes are largely classified into a solid-line type (white or yellow) and a periodic type (broken line or Bott's dots), and the solid-line lane feature extraction module 2020 and the periodic lane feature extraction module 2022 respectively extract different feature amounts. When at least one of a solid-line lane or a periodic lane is detected, the traveling road is highly likely to be on-road (paved road).

The road outside feature extraction module 2024 extracts a feature amount (luminance level or the like) of images of left-and-right road outside analysis regions to output a road outside feature amount. The road outside stability presence determination module 2025 analyzes a time-series change (periodicity or stability) of the output road outside feature amount to determine whether an object outside the road is an artificial object or a natural object such as grass, snow, or mud, and outputs road outside information indicating a probability that the object outside the road is an artificial object. For example, when a luminance level of a road outside analysis region does not change time-sequentially, it can be determined that a side strip is provided outside the road. When the luminance level of the road outside region periodically changes, it can be determined that an artificial object (e.g., guardrail or soundproof wall) is provided outside the road. When an artificial object is detected outside the road, the traveling road is highly likely to be on-road (paved road). When a natural object is detected outside the road, the traveling road is highly likely to be off-road (unpaved road).

The road surface paint feature extraction module 2026 extracts a feature of road surface paint (e.g., character paint of a pedestrian crossing, a stop line, or a speed limit) in a region between the left-and-right lane analysis regions. The road surface paint presence determination module 2027 analyzes a feature amount of the road surface paint to determine whether or not road surface paint is present, and outputs road surface paint information indicating a probability of presence of road surface paint. When road surface paint is detected outside the road, the traveling road is highly likely to be on-road (paved road).

The road surface color feature extraction module 2028 determines a color ratio of the image. The road surface covering presence determination module 2029 determines whether the road surface is covered based on a determined image color, and outputs road surface covering information indicating a probability of covering of the road surface. For example, when a predominant color of the image is white, the road surface is highly likely to be covered with snow.

Figure 3:
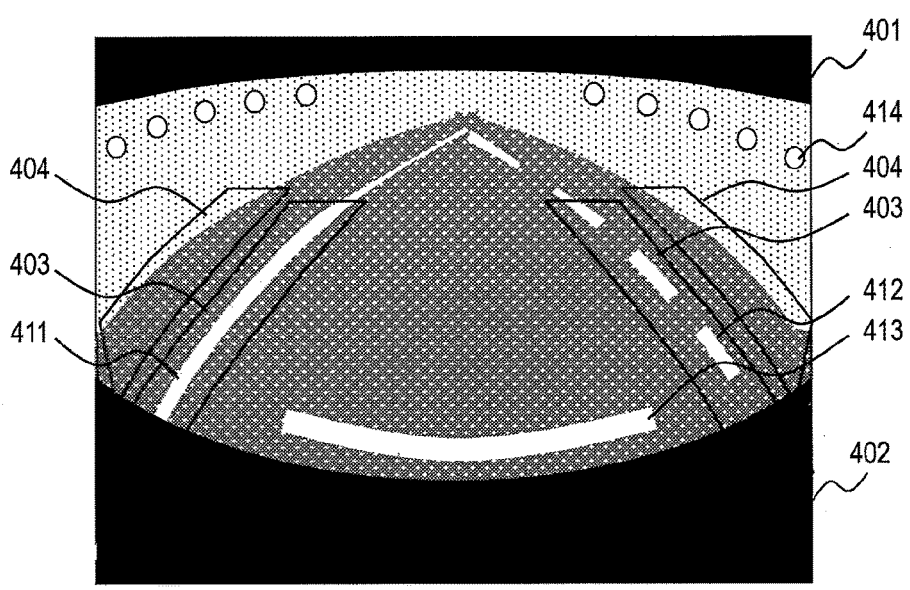
FIG. 3 is a diagram illustrating an example of an image input to the outside recognition system according to the first embodiment of this invention.

FIG. 3 is a diagram illustrating an example of an image input to the outside recognition system 1 according to the first embodiment.

An image is input from the on-vehicle camera to the outside recognition system 1 according to the first embodiment. The on-vehicle camera is a wide-angle camera having a wide angle of view or a narrow-angle camera having a narrow angle of view and capable of capturing images far into the distance, and mounted to the front or the rear of the vehicle. FIG. 3 illustrates an example of an image captured by the wide-angle camera.

An upper part of the image input from the on-vehicle camera includes a region 401 picturing at least one of a vehicle body or a light shielding plate, and a lower part of the image includes a region 402 picturing the vehicle body. Lane analysis regions 403 for analyzing lanes along which the vehicle travels are provided on left and right sides of the image. Road outside analysis regions 404 for analyzing a state outside the traveling road are provided outside the left and right lane analysis regions.

On a paved road, features such as a solid-line lane 411, a periodic lane 412, road surface paint 413, a street light 414, and a stable roadside part illustrated in FIG. 3 frequently appear. On the other hand, on an unpaved road, such features rarely appear. Those features are suitable for determining whether the traveling road is on-road or off-road, and can be extracted without greatly losing clarity even in bad weather or a dark night.

Figure 4:
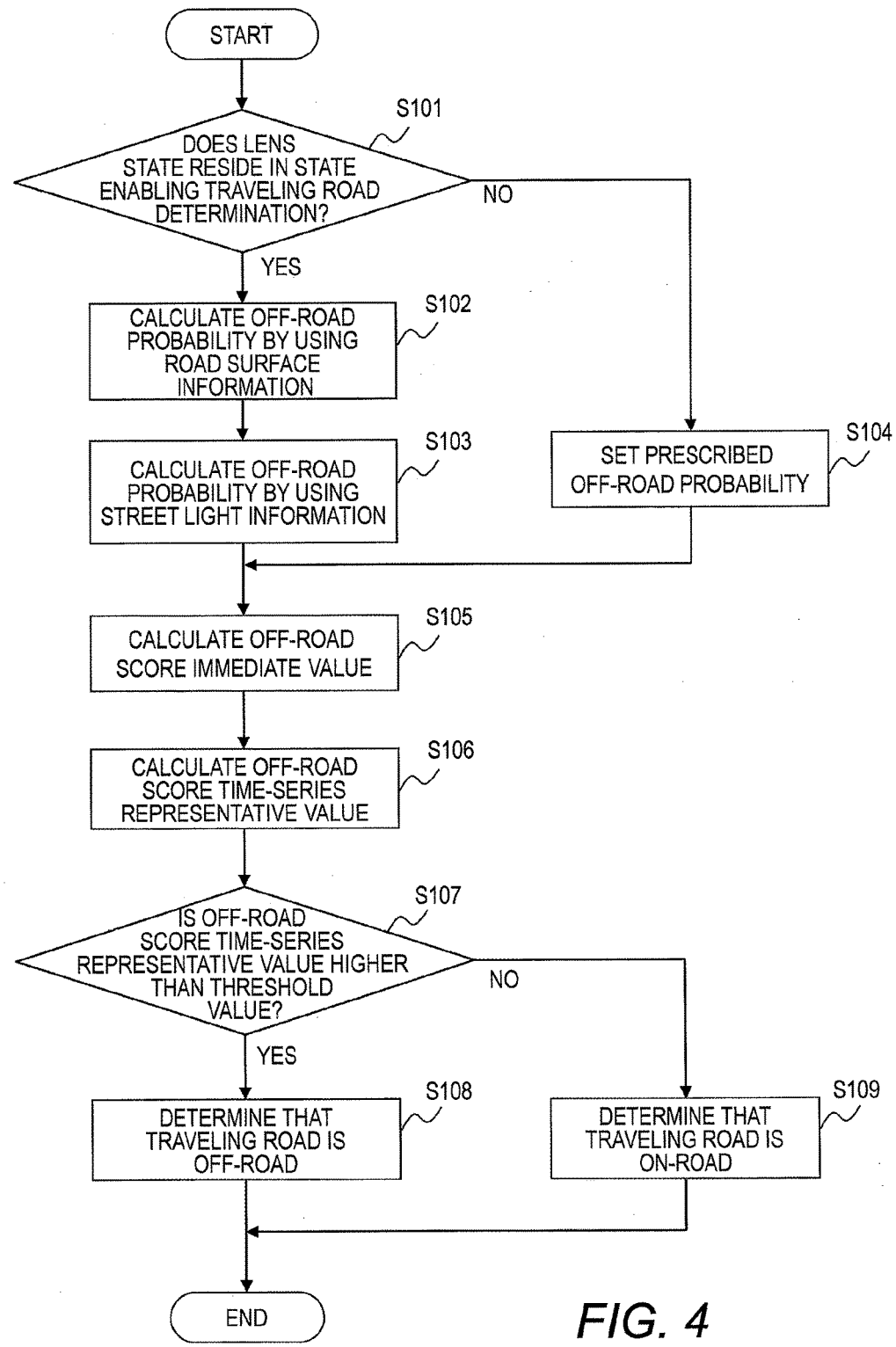
FIG. 4 is a flowchart illustrating processing executed by the traveling road determination module according to the first embodiment of this invention.

FIG. 4 is a flowchart illustrating processing executed by the traveling road determination module 203 according to the first embodiment.

First, in Step S101, the traveling road determination module 203 determines, by using lens state information output from the lens diagnosis module 204, whether a lens state resides in a state enabling determination of a traveling road. For example, in a lens state where a road surface is hardly visible, the traveling road is more likely determined to be off-road by mistake, and thus it is determined that determination of the traveling road is impossible. When it is determined that the lens state resides in a state enabling determination of a traveling road (YES in Step S101), in Step S102, the traveling road determination module 203 calculates a probability of the traveling road being off-road by using the road surface information analyzed by the road surface analysis module 202.

For example, the probability of the traveling road being off-road can be calculated by the following Bayes estimation. Specifically, a posterior probability (off-road probability) $p(C|x_{LANE})$ of a traveling road class after the road surface information has been obtained can be calculated by the following expression, where C denotes a traveling class (off-road or on-road) and N pieces of vector xLANE (solid-line lane information, periodic lane information, road outside information, road surface paint information, road surface covering information, and the like) indicate road surface information.

$$p(C|x_{LANE}) \propto p(x_{LANE}|C)p(C)$$

Assuming that each road surface information vector is independent, the posterior probability can be calculated by the following expression.

$$p(C|x_{LANE}) \propto p(C)\prod_{i=0}^{N} p(x_{LANE_i}|C)$$

Specifically, the posterior probability can be calculated by learning a probability of obtaining respective observation values from traveling road classes in advance, and multiplying a prior probability by a product thereof. The prior probability may be set to an arbitrary value or given by uniform distribution.

The above description is an example of a generation model for modeling an occurrence probability of observation data. However, a traveling road class may be determined by an identification model for modeling a determination function. For example, by using a support vector machine or boosting algorithm, a probability and a determination result of a traveling road class may be calculated after acquisition of observation information. A probability and a determination result of a traveling road class may also be calculated after acquisition of observation information by using a time-series generation model such as a hidden Markov model (HMM).

Then, in Step S103, the traveling road determination module 203 calculates an off-road probability p(C|xLIGHT) by the following expression by using light information vector xLIGHT (high-luminance region area rate, degree of high-luminance region concentration, number of high-luminance regions, and the like). For example, a score can be calculated from one of such viewpoints as a high possibility of the traveling road being on-road when a high-luminance region area rate is equal to or higher than a predetermined threshold value, a high possibility of the traveling road being on-road because of light directly output from a succeeding vehicle when a degree of high-luminance region concentration is high, and a high possibility of the traveling road being on-road because of a likelihood of a street light or a light of a surrounding building when the number of high-luminance regions is large.

$$p(C|x_{LIGHT}) \propto p(C)\prod_{i=0}^{N} p(x_{LIGHT_i}|C)$$

When it is determined that traveling road determination is impossible (NO in Step S101), calculation of p(C|xLANE) and p(C|xLIGHT) is inaccurate. Accordingly, in Step S104, prescribed values are set for scores thereof. For example, p(C|xLANE) and p(C|xLIGHT) are set to 0, and then the processing proceeds to Step S105 assuming that the traveling road is on-road.

Then, in Step S105, the traveling road determination module 203 calculates an off-road score immediate value $p(C|x_t)$ by calculating a weighted sum of the probabilities calculated in Steps S101 and S102. In the following expression, α denotes a weight of road surface information, and β denotes a weight of light information.

$$p(C|x_t) = \alpha p(x_{LANE}|C) + \beta p(x_{LIGHT}|C)$$

In Step S106, the traveling road determination module 203 stores off-road scores of a plurality of frames by a predetermined number (for fixed period of time), and calculates a time-series representative value of the off-road scores by calculating an average value or a median value thereof. Then, in Step S107, the traveling road determination module 203 determines whether the calculated time-series representative value of the off-road scores is higher than a predetermined threshold value. When the time-series representative value of the off-road scores is higher than the predetermined threshold value (YES in Step S107), in Step S108, the traveling road determination module 203 determines the traveling road to be off-road. On the other hand, when the time-series representative value of the off-road scores is equal to or lower than the predetermined threshold value (NO in Step S107), in Step S109, the traveling road determination module 203 determines the traveling road to be on-road.

The off-road probability using the road surface information and the off-road probability using the street light information are calculated in the stated order. However, the order is not limited to the illustrated order. Further, after the separate calculation of the off-road probability using the road surface information and the off-road probability using the street light information, the off-road scores are obtained by calculating the weighted sum. However, an off-road score of a current frame may be calculated by using the road surface information and the street light information in a comprehensive manner.

In addition to the above-mentioned method using each piece of road surface information, an off-road state or an on-road state may be determined in accordance with a rule using a decision tree.

As described above, according to the first embodiment of this invention, the inclusion of the street light analysis module configured to analyze the light in the image and the road surface analysis module configured to analyze the feature of the road surface from the image enables accurate determination of whether the traveling road state is on-road or off-road by using the two features of the space and the road surface. The road surface information used by the road surface analysis module is a feature (solid-line lane, periodic lane, road outside stability, or road surface paint) that does not lose clarity so greatly even in bad weather and a dark night. This enables suitable traveling road determination without incurring any great influence of weather, a time zone, or the like. In other words, erroneous determination or impracticable determination of the traveling road state can be greatly reduced.

Moreover, whether to carry out traveling road determination is determined based on the lens state. This can prevent any forcible determination from being executed in an extremely dirtied state of the lens. In other words, erroneous determination or impracticable determination caused by the lens dirt can be greatly reduced. Further, a possibility of the lens being dirtied can be accurately determined by using the determination result of the traveling road being on-road or off-road. For example, distinction between a water drop and muddy water among the substances adhered on the lens is difficult, and thus the type of the substance adhered on the lens can be estimated by using the determination result of the traveling road being on-road or off-road.

<Second Embodiment>

Next, a second embodiment of this invention is described.

Figure 5:
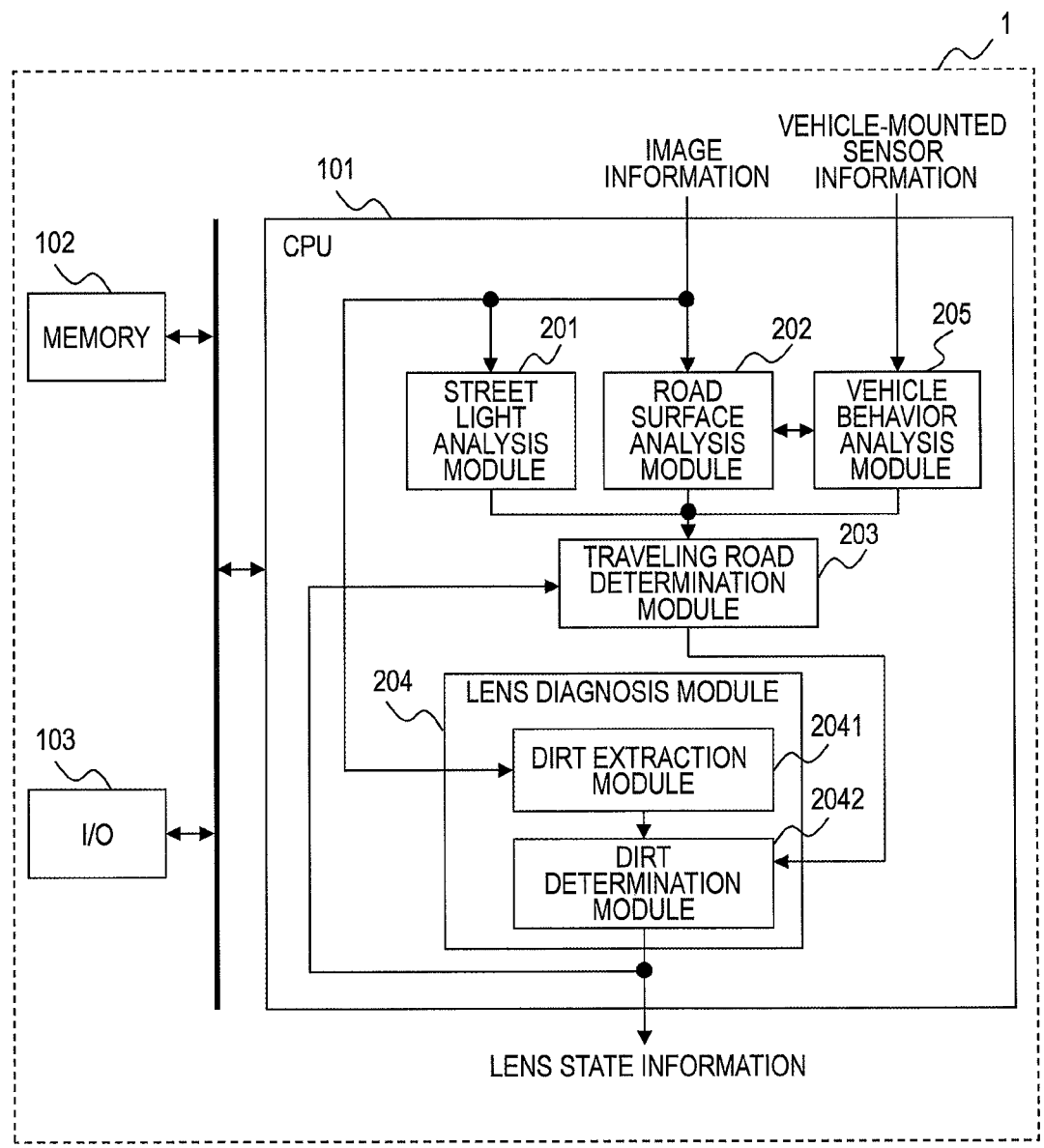
FIG. 5 is a block diagram illustrating a configuration of an outside recognition system according to a second embodiment of this invention of this invention.

FIG. 5 is a block diagram illustrating a configuration of an outside recognition system 1 according to the second embodiment of this invention.

The outside recognition system 1 according to the second embodiment is different from the above-mentioned outside recognition system 1 of the first embodiment in that information from an on-vehicle sensor is used in combination for the determination of whether the traveling road is on-road or off-road. Accordingly, the outside recognition system 1 according to the second embodiment includes a vehicle behavior analysis module 205. In the second embodiment, components and processes that are the same as those of the first embodiment are denoted by the same reference numerals or symbols, and description thereof is omitted.

A plurality of on-vehicle sensors (e.g., vehicle speed sensor, steering angle sensor, acceleration sensor, yaw rate sensor, and wheel speed sensor) are mounted on a vehicle on which the outside recognition system 1 according to the second embodiment is mounted. This enables the outside recognition system 1 to use information output from various on-vehicle sensors. For example, as on-vehicle sensor information, a vehicle speed output from the vehicle speed sensor, a steering angle output from the steering angle sensor, lateral and longitudinal accelerations output from the acceleration sensor, a yaw rate output from the yaw rate sensor, or a wheel speed output from the wheel speed sensor can be used. Further, as on-vehicle sensor information, operation information of various types of control systems such as an antilock braking system (ABS), a traction control system (TCS), and vehicle dynamics control (VDC) can be used. In addition to the above-mentioned information obtained from the sensors generally mounted on a vehicle, a pitching amount may be obtained by using a vehicle height sensor for measuring vehicle sinking and an acceleration sensor for measuring pitching, and on-vehicle sensor information obtained from those sensors may be used. Information obtained from sensors other than those described above may be used.

The vehicle behavior analysis module 205 is implemented by executing a predetermined program by the processor 101. The vehicle behavior analysis module 205 analyzes the information output from the on-vehicle sensor, and outputs vehicle behavior information indicating a behavior of the vehicle to the traveling road determination module 203.

The vehicle behavior analysis module 205 outputs the vehicle behavior information to the road surface analysis module 202, and the road surface analysis module 202 outputs road surface information to the vehicle behavior analysis module 205. For example, by using both solid-line lane information and periodic lane information output from the road surface analysis module 202 and steering angle information output from the vehicle behavior analysis module 205, lane changing can be highly accurately detected. Moreover, the road surface analysis module 202 can determine, based on a vehicle speed obtained from the vehicle behavior analysis module 205, whether a feature amount (periodicity) extracted by the periodic lane feature extraction module 2022 is valid. Thus, by sharing information on both sides, accuracy of information enabling on-road determination can be improved, and a traveling road can be suitably determined.

The traveling road determination module 203 determines whether a state of the traveling road is on-road or off-road based on the light information analyzed by the street light analysis module 201, the road surface information analyzed by the road surface analysis module 202, the vehicle behavior information analyzed by the vehicle behavior analysis module 205, and the lens state analyzed by the lens diagnosis module 204. In other words, the traveling road determination module 203 determines whether the traveling road is on-road or off-road by time-sequentially analyzing the light information, the road surface information, and the vehicle behavior information. Processing executed by the traveling road determination module 203 is described in detail below referring to FIG. 6.

Figure 6:
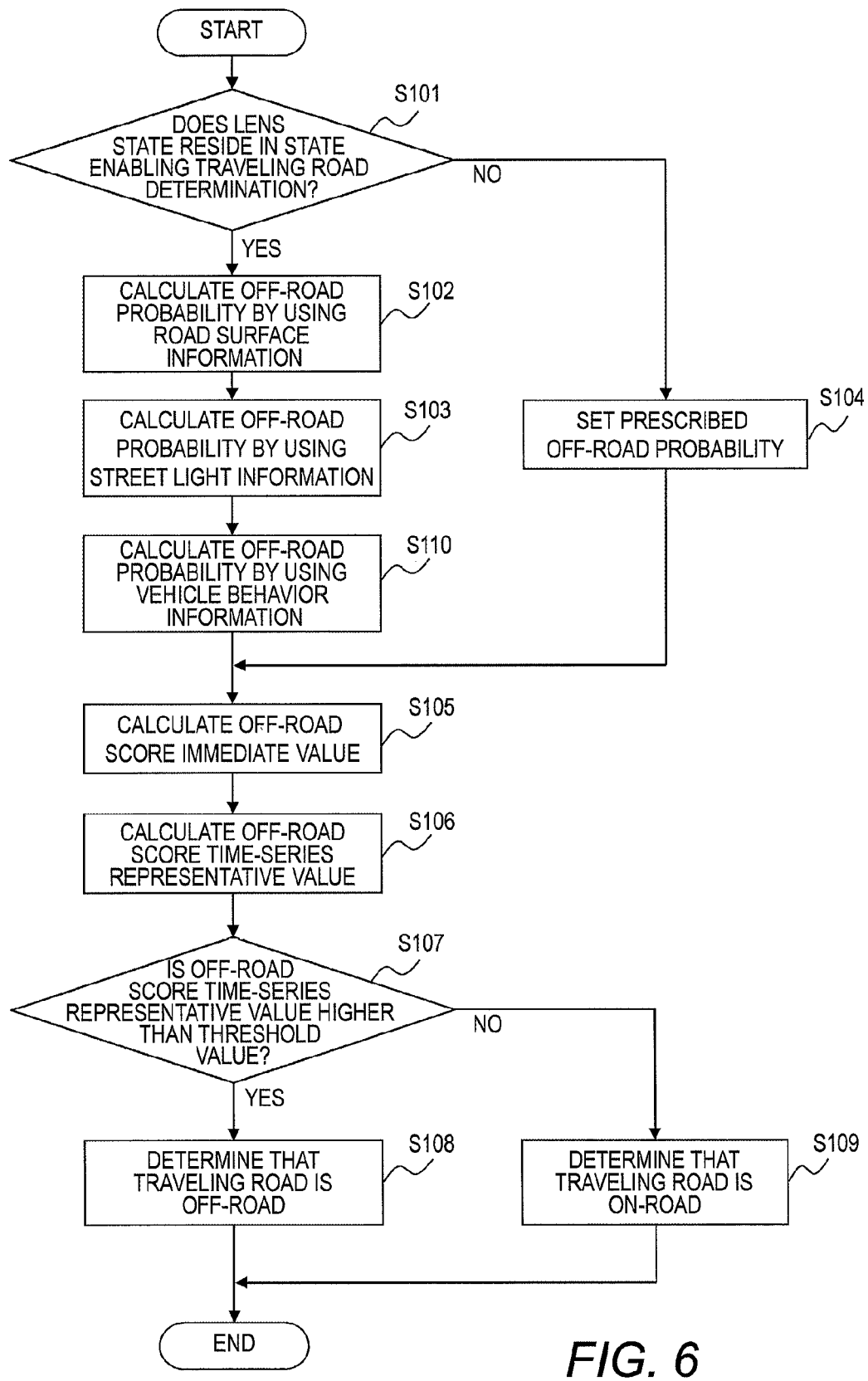
FIG. 6 is a flowchart illustrating the processing executed by the traveling road determination module according to the second embodiment of this invention.

FIG. 6 is a flowchart illustrating the processing executed by the traveling road determination module 203 according to the second embodiment.

The traveling road determination module 203 according to the second embodiment determines the state of the traveling road based on, in addition to the light information and the road surface information, the vehicle behavior information analyzed by the vehicle behavior analysis module 205. Accordingly, Step S110 is added.

In Step S110, the traveling road determination module 203 calculates, after calculation of the probability of the traveling road being off-road carried out by using the light information in Step S103, a probability of the traveling road being off-road by using the vehicle behavior information.

For example, when a vehicle speed is extremely high (e.g., more than 100 km/h), traveling on a highway is presumed, and a possibility of the traveling road being on-road (paved road) is high. When large steering angles are continuously detected during traveling, namely, when a turning radius is small, turning at an intersection or driving around in a field such as a parking space is presumed, and a possibility of the traveling road being on-road is high. When variation is large in at least one of vehicle speed or steering angle, a possibility of the traveling road being off-road (unpaved road) is high. When variation is large in wheel speed, a difference in gripping between wheels is presumed, and a possibility of the traveling road being off-road is high. When a lateral acceleration is large, lateral vibration is large, and thus a possibility of the traveling road being off-road is high. When a large longitudinal acceleration is detected, acceleration/deceleration is frequently executed, and thus a possibility of the traveling road being off-road is high. When the ABS, the TCS, or the VDC frequently operates, gripping (friction) on the road surface is presumed to be low, and thus a possibility of the traveling road being off-road is high. When large pitching is detected, vertical vibration is large, and thus a possibility of the traveling road being off-road is high. To describe such knowledge by a probability model, in Step S110, vehicle information vector is represented by xVEHICLE, and a probability p(C|xVEHICLE) of the traveling road being off-road is calculated by the following expression.

$$p(C|x_{VEHICLE}) \propto p(C)\prod_{i=0}^{N} p(x_{VEHICLE_i}|C)$$

Then, in Step S105, the traveling road determination module 203 calculates an off-road score immediate value p(C|x_t) by calculating a weighted sum of the probabilities calculated in Steps S102, S103, and S110. In the following expression, α denotes a weight of road surface information, β denotes a weight of light information, and γ denotes a weight of vehicle behavior information.

$$p(C|x_t)=\alpha p(x_{LANE}|C)+\beta p(x_{LIGHT}|C)+\gamma p(x_{VEHICLE}|C)$$

A subsequent determination method is the same as that of the first embodiment, and thus description thereof is omitted.

The off-road probability using the road surface information, the off-road probability using the street light information, and the off-road probability using the vehicle behavior information are calculated in the stated order. However, the order is not limited to the illustrated order. Further, after the separate calculation of the off-road probability using the road surface information, the off-road probability using the street light information, and the off-road probability using the vehicle behavior information, the off-road scores are obtained by calculating the weighted sum. However, an off-road score immediate value may be calculated by using the road surface information, the street light information, and the vehicle behavior information in a comprehensive manner.

For example, the road surface information, the street light information, and the vehicle behavior information include unclear information (information that does not enable determination of a traveling road by itself but is combined with others to be effective) suited for being described as the probability model and information (definitive information that enables determination of a traveling road by itself) not suited for being described as the probability model. Accordingly, partial information suited for being described as the probability model may be selected from the road surface information, the street light information, and the vehicle behavior information to constitute road surface/street light/vehicle behavior information vector, and an off-road score immediate value may be calculated by a method similar to the above-mentioned method. Then, the off-road score immediate value may be forcibly rewritten by using the information that enables determination of the traveling road. For example, the traveling road can be determined more suitably by adding processing such as determination of an on-road state when the vehicle speed is equal to or higher than 120 km/h or determination of an off-road state when the TCS or the VDC operates.

As described above, according to the second embodiment of this invention, the information obtained from the on-vehicle sensor is used. This can further improve on-road/off-road determination performance in an environment such as the dark or bad weather or in a dirtied state of the lens where distinction is difficult based on image information alone. By using a feature of high distinction performance obtained from the on-vehicle sensor, the number of cases where the traveling road can be determined to be on-road or off-road can be increased. In other words, a probability of correctly determining a traveling road state can be increased.

<Third Embodiment>

Next, a third embodiment of this invention is described.

Figure 7:
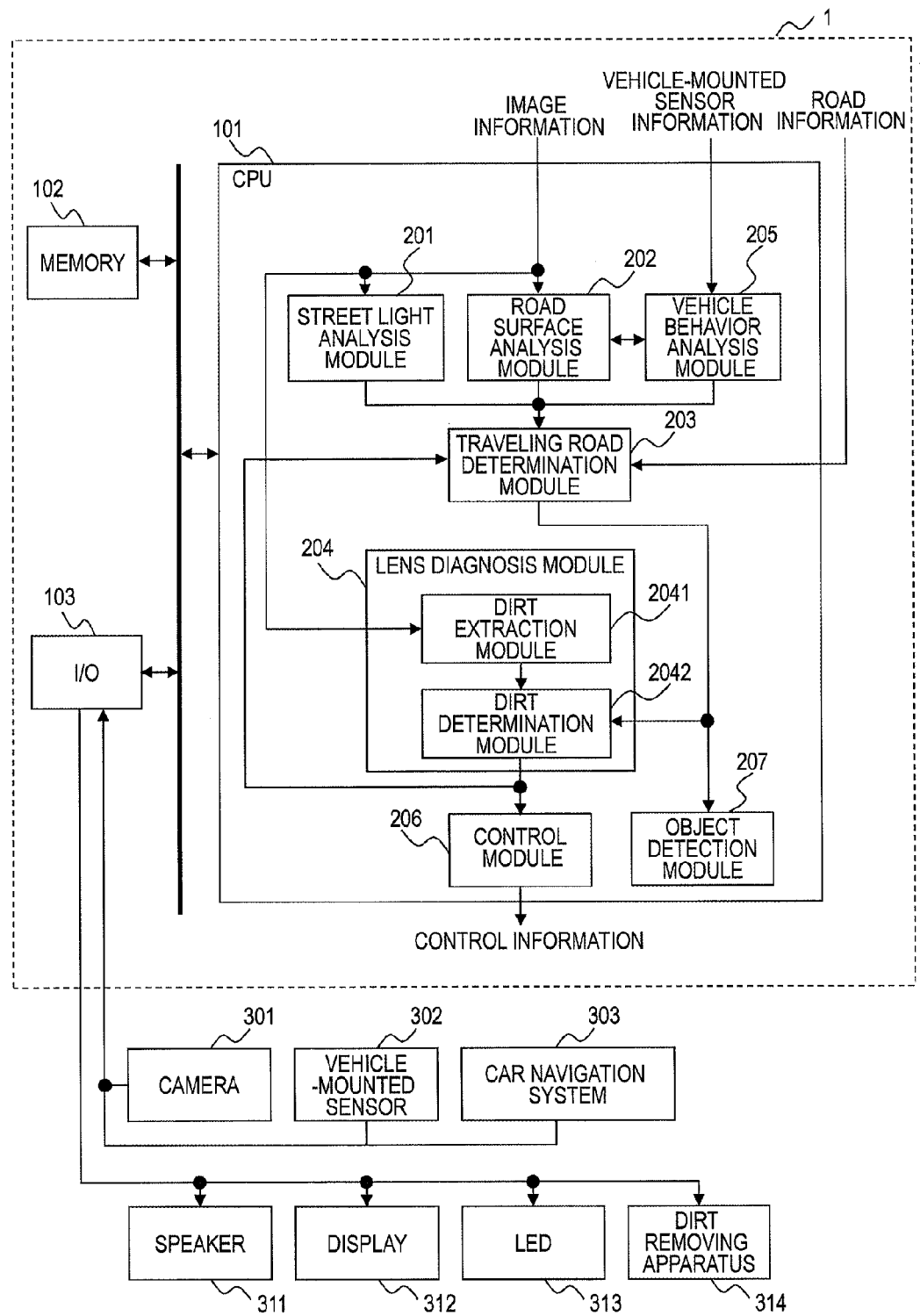
FIG. 7 is a block diagram illustrating a configuration of an information system of a vehicle on which the outside recognition system according to a third embodiment of this invention.

FIG. 7 is a block diagram illustrating a configuration of an information system of a vehicle on which the outside recognition system 1 according to the first or second embodiment is mounted.

An outside recognition system 1 according to the third embodiment is different from the above-mentioned outside recognition systems 1 of the first and second embodiments in that a control module 206 and an object detection module 207 are included. In the third embodiment, components and processes that are the same as those of the first and second embodiments are denoted by the same reference numerals or symbols, and description thereof is omitted.

A camera 301, an on-vehicle sensor 302, and a car navigation system 303 are connected to an input/output interface 103. The camera 301 is a wide-angle camera having a wide angle of view or a narrow-angle camera having a narrow angle of view and capable of capturing images far into the distance, and mounted to a front or a rear of a vehicle to provide an image outside the vehicle to the outside recognition system 1. The on-vehicle sensor 302 is a vehicle speed sensor, a steering angle sensor, an acceleration sensor, a yaw rate sensor, a wheel speed sensor, or the like, and provides information about a behavior of the vehicle to the outside recognition system 1. The on-vehicle sensor 302 may include various types of control systems such as an ABS, a TCS, and a VDC. The car navigation system 303 is a system for performing route guidance from a position of the own vehicle to a destination, and provides road information such as a road type or a road width to the outside recognition system 1.

A speaker 311, a display 312, a lamp (light-emitting diode: LED) 313, and a dirt removing apparatus 314 are also connected to the input/output interface 103.

The speaker 311, the display 312, the lamp 313, and the dirt removing apparatus 314 are apparatus to be controlled by the outside recognition system 1, and operations thereof are controlled by the control module 206.

The speaker 311 is an apparatus for converting an electric signal into a sound. The display 312 is a display apparatus for displaying a predetermined message, and is formed of, for example, a liquid crystal display panel (LCD). The lamp 313 is a light-emitting element such as a light-emitting diode. The speaker 311, the display 312, and the lamp 313 are notification apparatus for notifying a driver or a passenger that a dirt amount has exceeded a predetermined threshold value.

The speaker 311, the display 312, and the lamp 313 function as notification apparatus for issuing a warning concerning a collision object detected by the object detection module 207.

The dirt removing apparatus 314 is an apparatus such as a wiper, a washer, or an air injector for removing lens dirt of the camera 301.

The control module 206 and the object detection module 207 are implemented by executing a predetermined program by the processor 101. The control module 206 controls a control target (dirt removing apparatus, object recognition module, or notification apparatus). For example, a type and an amount of a substance adhered on the lens are obtained and, when an amount of dirt exceeds a predetermined threshold value, the dirt removing apparatus (wiper, washer, or air injector for removing lens dirt) is operated. The object detection module 207 extracts an object (vehicle, two-wheel vehicle, or pedestrian) that is included in an input image and is likely to affect traveling of the vehicle. This can achieve a collision warning system for issuing a warning when an object highly likely to collide with the own vehicle is detected.

The traveling road determination module 203 may determine whether a traveling road is on-road or off-road based on a type of a road obtained from the car navigation system 303. For example, when a type of a road on which the vehicle currently travels is a highway or a general road, the traveling road state can be determined to be on-road.

When the traveling road determination module 203 determines that the vehicle currently travels off-road, a possibility of presence of a collision object is low. Thus, the object detection module 207 may increase a determination threshold value used for object detection.

As described above, according to the third embodiment of this invention, based on the on-road/off-road determination result, a collision object can be accurately detected to suppress erroneous detection. Dirt can be suitably distinguished based on the on-road/off-road determination result to be accurately removed. Through use of the road information obtained from the car navigation system, a traveling road can be determined with high accuracy.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (Solid State Drive), or a storage medium such as an IC card, or an SD card.

The drawings illustrate control lines and information lines as considered necessary for explanation but do not show all control lines or information lines in the products. It can be considered that almost of all components are actually interconnected.

What is claimed is:

1. A state recognition system configured to recognize a state of a traveling road on which a vehicle travels, the state recognition system being configured to:
    select a substance adhered on a lens of a camera mounted on the vehicle in an image captured by the camera; and
    determine whether the traveling road is on-road or off-road by applying a probabilistic model to a type and an amount of the substance adhered on the lens of the camera.

2. A state recognition system configured to recognize a state of a traveling road on which a vehicle travels, comprising:
    a lens diagnoser, wherein the lens diagnoser diagnoses a state of a lens of a camera mounted on the vehicle based on an image captured by the camera;
    a road surface analyzer, wherein the road surface analyzer analyzes a feature of a road surface of the traveling road based on a probabilistic model applied to the image; and
    a traveling road determiner, wherein the traveling road determiner determines whether the traveling road is on-road or off-road based on road surface information obtained from the feature of the road surface and the state of the lens.

3. The state recognition system according to claim 2, wherein:
    the state of the lens includes an amount of a substance adhered on the lens; and
    the road surface information includes information indicating whether at least one of a solid-line lane, a periodic lane, or road surface paint is present on the road surface.

4. The state recognition system according to claim 2, further comprising a light analyzer, wherein the light analyzer determines whether a current time is day or night based on the image and analyzes a light around the traveling road when it is determined that the current time is night,
    wherein the traveling road determiner further determines whether the traveling road is on-road or off-road based on the state of the lens, the road surface information and information of the light analyzed by the light analyzer.

5. The state recognition system according to claim 4, wherein the vehicle includes a sensor that detects a traveling state of the vehicle, and the traveling road determiner further determines whether the traveling road is on-road or off-road based on the state of the lens, the road surface information, the information of the light and information output from the sensor.

6. The state recognition system according to claim 3, wherein the lens diagnoser further determines whether the-substance-adhered on the lens of the camera is water or mud based on the state of the traveling road.

7. A state recognition method for recognizing, by an on-vehicle system, a state of a traveling road on which a vehicle travels, the on-vehicle system including a processor that performs predetermined processing by executing a program, and a memory that stores the program, the state recognition method comprising:

selecting, by the processor, a substance adhered on a lens of a camera mounted on the vehicle in an image captured by the camera; and determining, by the processor, whether the traveling road is on-road or off-road by applying a probabilistic model to a type and an amount of the substance adhered on the lens of the camera.

8. A state recognition method for recognizing, by an on-vehicle system, a state of a traveling road on which a vehicle travels, the on-vehicle system including a processor that performs predetermined processing by executing a program, and a memory that stores the program, the state recognition method comprising:

diagnosing, by the processor, a state of a lens of a camera mounted on the vehicle based on an image captured by the camera;

analyzing, by the processor, a feature of a road surface of the traveling road by applying a probabilistic model to the image; and determining, by the processor, whether the traveling road is on-road or off-road based on road surface information obtained from the feature analyzed in the analyzing of the feature of the road surface and the state of the lens diagnosed in the diagnosing.

9. The state recognition method according to claim 8, wherein:

the state of the lens includes an amount of a substance adhered on the lens; and the road surface information includes information indicating whether at least one of a solid-line lane, a periodic lane, or road surface paint is present on the road surface.

10. The state recognition method according to claim 8, further comprising analyzing, by the processor, a light around the traveling road when it is determined that a current time is night after determining whether the current time is day or night based on the image, wherein in the determining traveling road, it is determined whether the traveling road is on-road or off-road based on the state of the lens, the road surface information and information of the light analyzed in the analyzing the light.

11. The state recognition method according to claim 10, wherein:

the vehicle includes a sensor that detects a traveling state of the vehicle; and in the determining traveling road, it is determined whether the traveling road is on-road or off-road based on the state of the lens, the road surface information, the information of the light and information output from the sensor.

12. The state recognition method according to claim 9, wherein the diagnosing the lens includes determining whether the substance adhered on the lens of the camera is water or mud based on the state of the traveling road determined in the determining the traveling road.

13. The state recognition system of claim 1, wherein the probabilistic model is a hidden Markov model.

14. The state recognition system of claim 1, wherein the probabilistic model includes Bayes estimation.

15. The state recognition system of claim 2, wherein the probabilistic model is a hidden Markov model.

16. The state recognition system of claim 2, wherein the probabilistic model includes Bayes estimation.

17. The state recognition method of claim 7, wherein the probabilistic model is a hidden Markov model.

18. The state recognition method of claim 7, wherein the probabilistic model includes Bayes estimation.

19. The state recognition method of claim 8, wherein the probabilistic model is a hidden Markov model.

20. The state recognition method of claim 8, wherein the probabilistic model includes Bayes estimation.

* * * * *